(12) United States Patent
Manabe (10) Patent No.: US 7,732,986 B2
(45) Date of Patent: Jun. 8, 2010

(54) DRIVING APPARATUS

(75) Inventor: Mitsuo Manabe, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 9 days.

(21) Appl. No.: 11/730,040

(22) Filed: Mar. 29, 2007

(65) Prior Publication Data

US 2007/0228883 A1   Oct. 4, 2007

(30) Foreign Application Priority Data

Mar. 30, 2006   (JP)   ............................. P2006-093468

(51) Int. Cl.
*H01L 41/053* (2006.01)
*H02N 2/04* (2006.01)
(52) U.S. Cl. ...................... 310/328; 310/329
(58) Field of Classification Search ................. 310/328, 310/329, 323.01–323.21
See application file for complete search history.

(56) References Cited

U.S. PATENT DOCUMENTS

| | | | |
|---|---|---|---|
| 4,435,666 A | 3/1984 | Fukui et al. | |
| 5,712,524 A | 1/1998 | Suga | |
| 6,188,161 B1* | 2/2001 | Yoshida et al. | 310/328 |
| 7,315,108 B2* | 1/2008 | Okamoto et al. | 310/323.17 |
| 2001/0026112 A1* | 10/2001 | Yoshida et al. | 310/328 |
| 2006/0082253 A1* | 4/2006 | Hara | 310/317 |
| 2006/0232169 A1* | 10/2006 | Sasaki et al. | 310/329 |
| 2007/0035205 A1 | 2/2007 | Shirie | |

FOREIGN PATENT DOCUMENTS

JP   2633066 B2   4/1997

* cited by examiner

*Primary Examiner*—Walter Benson
*Assistant Examiner*—Derek J Rosenau
(74) *Attorney, Agent, or Firm*—Birch, Stewart, Kolasch & Birch, LLP

(57) ABSTRACT

A driving apparatus comprises: an electro-mechanical conversion element; a driving member that reciprocates in response to an extension and contraction of the electro-mechanical conversion element; and a driven member, frictionally engaged with the driving member, that moves by reciprocating the driving member, wherein the driving member comprises a shaft portion which extends in a direction of extension and contraction of the electro-mechanical conversion element in a position which lies on a side of the electro-mechanical conversion element, and the driven member is frictionally engaged with the shaft portion.

7 Claims, 8 Drawing Sheets

DRIVING APPARATUS

BACKGROUND OF THE INVENTION

1. Field of the Invention

The present invention relates to a driving apparatus which utilizes an electro-mechanical conversion element such as a piezoelectric element.

2. Description of the Related Art

As the related-art driving apparatus which utilizes an electro-mechanical conversion element such as a piezoelectric element, as is described in the Japanese Patent No. 2633066, a driving apparatus is known in which a driving member (a drive rod) is caused to reciprocate in response to extension and contraction of an electro-mechanical conversion element (a piezoelectric element), so as to move a lens barrel which is frictionally engaged with the driving member along the driving member. In this driving apparatus, the driving member is attached to an end face of the electro-mechanical conversion element, and the driving member is provided continuously to and coaxially with the electro-mechanical conversion element.

However, since in the driving apparatus like this, the electro-mechanical conversion element and the driving member are continuously connected to each other and the driving member extends in the direction of extension and contraction of the electro-mechanical conversion element, it is difficult to reduce the size of the driving apparatus to a size which is equal to or shorter than a total length of the electro-mechanical conversion element and the driving member. In the event that the driving apparatus like this is attempted to be installed in small portable equipment such as a mobile phone for moving a photographic lens system, the driving apparatus is desirably made to be as small as possible. In particular, in order to reduce the thickness of the small portable equipment, the driving apparatus is desirably made to be short in the direction of extension and contraction of the electro-mechanical conversion element.

SUMMARY OF THE INVENTION

Then, the invention was made with a view to solving the technical problem inherent in the related-art driving apparatus, and an object thereof is to provide a driving apparatus which can realize the reduction in the size thereof.

According to the invention, there is provided a driving apparatus comprising: an electro-mechanical conversion element; a driving member that reciprocates in response to an extension and contraction of the electro-mechanical conversion element; and a driven member, frictionally engaged with the driving member, that moves by reciprocating the driving member, wherein the driving member comprises a shaft portion which extends in a direction of extension and contraction of the electro-mechanical conversion element in a position which lies on a side of the electro-mechanical conversion element, and the driven member is frictionally engaged with the shaft portion.

According to this invention, the driving member has the shaft portion which extends in the direction of extension and contraction of the electro-mechanical conversion element in the position which lies on the side of the electro-mechanical conversion element, and the driven member is in frictionally engaged with the shaft portion. Because of this, it becomes possible to avoid the problem that the driving member extends long in the direction of extension and contraction of the electro-mechanical conversion element from the end face of the electro-mechanical conversion element, a reduction in the length of the driving apparatus in the direction of extension and contraction of the electro-mechanical conversion element being thereby realized. Consequently, the reduction in the size of the driving apparatus can be realized.

In addition, in a driving apparatus according to the invention, the shaft portion is preferably disposed in such a manner as to cover the periphery of the electro-mechanical conversion element. Additionally, in a driving apparatus according to the invention, the shaft portion preferably has a circular pillar-like shape or a circular cylindrical shape.

Moreover, in a driving apparatus according to the invention, the driving member preferably has a composite resin material.

DETAILED DESCRIPTION OF THE INVENTION

Hereinafter, an embodiment of the invention will be described in detail by reference to the accompanying drawings. Note that in description of the drawings, like reference numerals are imparted to like elements, and the repetition of the same description will be omitted.

Figure 1:
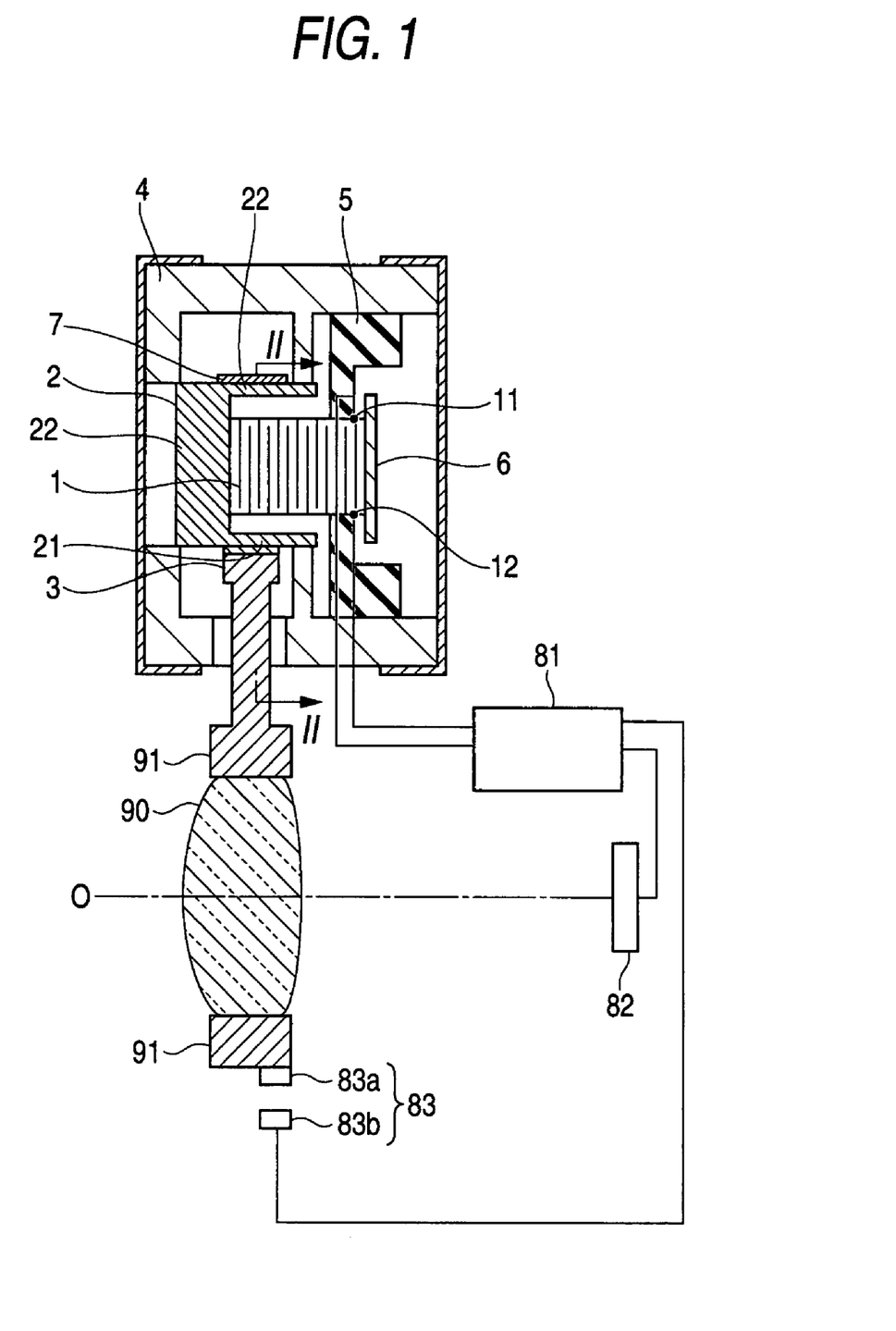
FIG. 1 is a sectional view showing a driving apparatus according to an embodiment of the invention.
Figure 2:
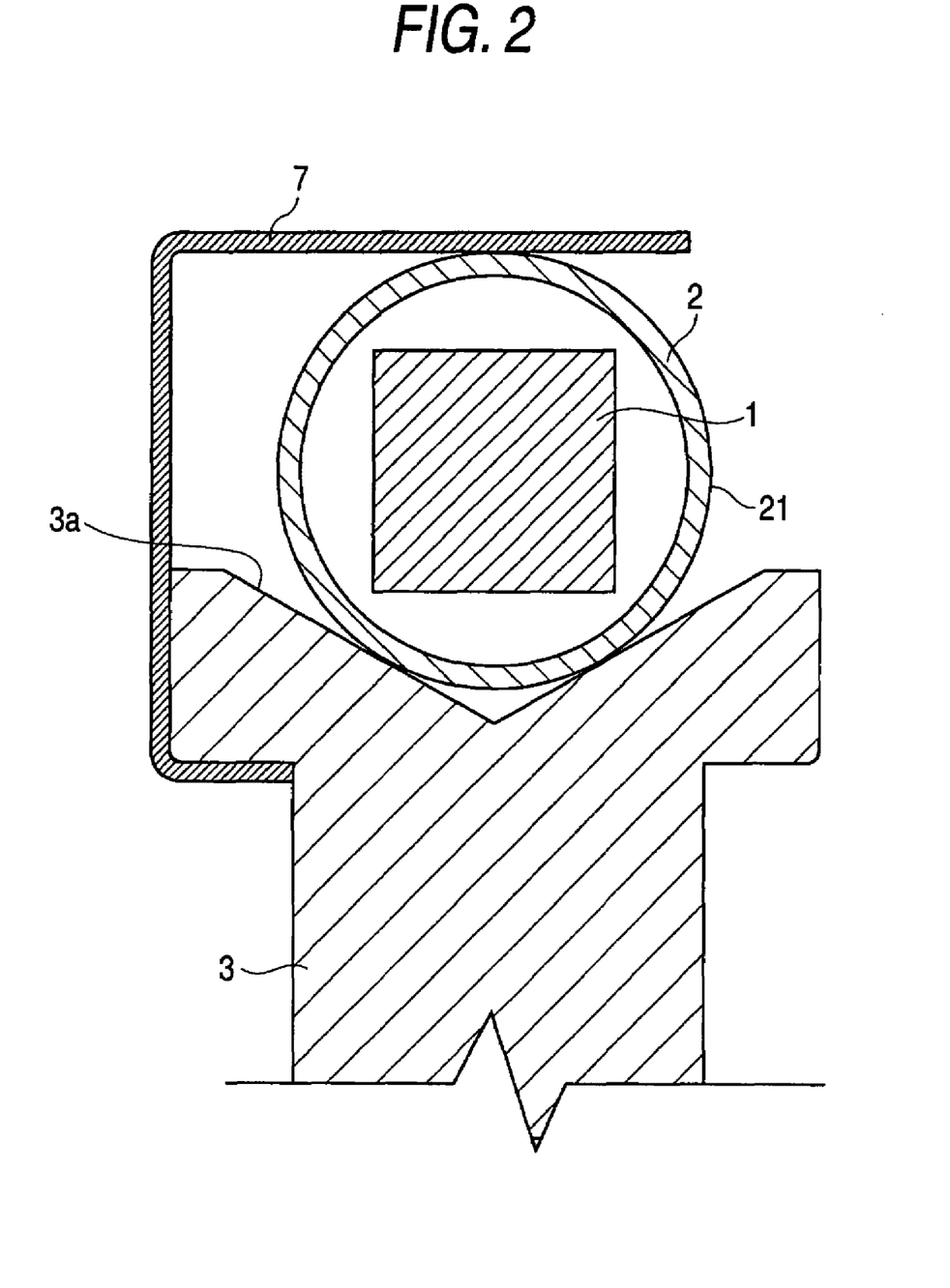
FIG. 2 is a sectional view of a driven member which is taken along the line II-II in FIG. 1.

FIG. 1 is a sectional view of a driving apparatus according to an embodiment of the invention. FIG. 2 is a sectional view of a mounting portion of a driven member which is taken along the line II-II in FIG. 1.

As is shown in FIG. 1, the driving apparatus according to the embodiment is such as to move a driven member 3 which is frictionally engaged with a driving member 2 along the driving member 2 by reciprocating the driving member 2 in response to extension and contraction of a piezoelectric element 1.

The piezoelectric element 1 is an electro-mechanical conversion element which can extend and contract when electric signals are inputted and is designed to extend and contract in a predetermined direction. This piezoelectric element 1 is connected to a control unit 81, so as to be caused to extend and contract when electric signals are inputted by the control unit 81. For example, two input terminals 11, 12 are provided on the piezoelectric element 1. By repeatedly increasing and decreasing a voltage that is impressed to these input terminals 11, 12, the piezoelectric element 1 is caused to extend and contract repeatedly.

The driving member 2 is attached to an end portion of the piezoelectric element 1 and is caused to reciprocate along the direction of extension and contraction of the piezoelectric element 1 in response to extension and contraction thereof. As the driving member 2, for example, a cylindrical element is used in which one end portion 22 of a cylindrical portion 21 is closed. This driving member 2 is provided in such a manner that the cylindrical portion 21 covers the periphery of the piezoelectric element 1 and is mounted in such a state that an interior surface of the end portion 22 is in abutment with an end portion of the piezoelectric element 1. The cylindrical portion 21 functions as a shaft portion which extends in the direction of extension and contraction of the piezoelectric element 1 in a position lying on a side of the piezoelectric element 1. The driven member 3 is mounted on an outside of the cylindrical portion 21 in such a manner as to be in frictional contact therewith.

The cylindrical portion 21 of the driving member 2 is borne by a stationary frame 4 and is supported on the stationary frame 4 in such a manner as to reciprocate in the direction of extension and contraction of the piezoelectric element 1. The stationary frame 4 functions as a box element in which the piezoelectric element 1, the driving member 2 and the driven member 3 are accommodated and assembled together.

Since its construction becomes relatively complex, the driving member 2 is preferably formed from a thermoplastic resin through injection molding, and the driving member 2 is more preferably made from, among thermoplastic resins, a high-performance engineering plastic (polyamide, polyacetal or polycarbonate resin). In addition, in order to increase the strength further, the driving member 2 is most preferably made from a composite resin material in which glass or carbon is mixed into the aforesaid resin material. Note that glass or carbon is used in various forms depending on purposes or applications which include glass or carbon fibers or grains.

Note that while FIG. 1 shows a form in which the driving member 2 is supported at two locations such as on a proximal end side and a distal end side thereof, there may also occur a case where the driving member 2 is supported on either the proximal end side or the distal end side thereof.

In addition, while FIG. 1 illustrates a case where portions where the driving member 2 is supported are made integral with the stationary frame 4, these support portions may be formed as separate elements from the stationary frame 4 so as to be mounted on the stationary frame 4. Also with the separate support portions, a similar function and advantage to those provided by the integrated support portions can be obtained.

Additionally, while for example, the cylindrical part having a circular cross section is used as the cylindrical portion 22 of the driving member 2, a cylindrical element may be used which has a cross section resulting by cutting away part of the circular shape. For example, a cylindrical element may be used which has an oval cross section which results by cutting away both side portions of the circular shape.

The driven member 3 is movably mounted on the driving member 2. This driven member 3 is mounted on the driving member 2 in such a state that the driven member 3 is frictionally engaged with the driving member 2 and is allowed to move along the direction of extension and contraction of the piezoelectric element 1. For example, the driven member 3 is brought into press contact with the driving member 2 by means of a leaf spring 7 so as to be frictionally engaged with the driving member 2 with a predetermined friction coefficient, so as to be pressed against the driving member 2 under a certain determined pressure, whereby the driven member 3 is mounted on the driving member 2 in such a manner as to produce a certain determined frictional force as it moves. When the driving member 2 moves to overcome the frictional force, the driven member 3 maintains the position where it is by virtue of inertia, whereby the driving member 2 moves relative to the driven member 3 which is left in its position.

The piezoelectric element 1 is mounted on the stationary frame 4 by a support member 5. The support member 5 is such as to be mounted in such a manner as to support the piezoelectric element 1 from sides thereof relative to the direction of extension and contraction thereof and is interposed between the piezoelectric element 1 and the stationary frame 4. In this case, the piezoelectric element 1 is preferably supported by the support member 5 from a direction which intersects the direction of extension and contraction of the piezoelectric element 1 at right angles. The support member 5 functions as a mounting member which supports the piezoelectric element 1 from the sides thereof for mounting.

The support member 5 is formed of an elastic element having an elastic property which is equal to or larger than a predetermined level and is formed of, for example, a silicone resin. The support member 5 is made to have a through hole which is provided so that the piezoelectric element 1 is passed therethrough and is assembled to the stationary frame 4 in such a state that the piezoelectric element 1 is inserted thereinto. The support member 5 is secured to the stationary frame 4 by virtue of bonding using an adhesive. In addition, the support member 5 is also secured to the piezoelectric element 1 by virtue of bonding using the adhesive. By making up the support member 5 of the elastic element, the support member 5 can support the piezoelectric element 1 in such a manner as to move in the direction of extension and contraction thereof. In FIG. 1, although two support members 5 are illustrated to lie on both the sides of the piezoelectric element 1, respectively, these support members 5, 5 are so illustrated due to the annular support member 5 being shown in a sectional view which results by cutting it along a horizontal plane.

In addition, the support member 5 may be secured to the stationary frame 4 and the piezoelectric element 1 by press fitting the support member 5 between the stationary frame 4 and the piezoelectric element 1 so that the support member 5 is pressed against the stationary frame 4 and the piezoelectric element 1, respectively. For example, a support member 5 is made up of an elastic element into a size or thickness which is larger than a space defined between the stationary frame 4 and the piezoelectric element 1, and the support member 5 so made is press fitted into the space so as to be placed therein. As this occurs, the support member 5 is provided in such a manner as to be closely secured to the stationary frame 4 and the piezoelectric element 1. As this occurs, the piezoelectric element 1 is pressed against by the support member 5 from both the sides thereof in the direction which intersects the direction of extension and contraction of the piezoelectric element 1 at right angles, whereby the piezoelectric element 1 is supported.

In addition, while the support member 5 has been described as being formed of the silicone resin here, the support member 5 may be made up of a spring member. For example, a spring member is interposed between the stationary frame 4 and the piezoelectric element 1 so that the piezoelectric element 1 is supported relative to the stationary frame 4 by this spring member.

A weight member 6 is attached to an end portion of the piezoelectric element 1. The weight member 6 is a member for transmitting extension and contraction forces of the piezoelectric element 1 to the driving member 2 side and is attached to the end portion of the piezoelectric element 1 which is opposite to an end portion where the driving member 2 is mounted. A part which is heavier than the driving member 2 is used as the weight member 6. In addition, as the weight member 6, a part is preferably used in which metallic powder is mixed into an elastically deformable material. The mixing of the metallic powder can increase the weight of the weight member 6, and the utilization of the elastically deformable material can dampen unnecessary resonance at the time the piezoelectric element is put into operation.

A material whose Young's modulus is smaller than those of the piezoelectric element 1 and the driving member 2 is used as a material for the weight member 6. As the Young's modulus of the weight member 6, 1 GPa or less is preferable, and 300 MPa or less is more preferable. The weight member 6 like this is formed by mixing metallic powder whose specific weight is large into an elastic material such as rubber, and the weight member 6 is produced by mixing tungsten powder into a urethane resin or urethane rubber. In order to reduce the size of the driving apparatus, the specific weight of the weight member 6 is preferably as large as possible and is set substantially to range, for example, from 8 to 12. In addition, when producing a weight member 6 by mixing tungsten powder into urethane rubber or urethane resin, a Young's modulus of the order of 60 MPa and a specific weight of the order of 11.7 result. Consequently, when wanting to design a weight member 6 which has as small a volume as possible, although a weight member 6 is optimum which has a combination of a large specific weight and a small Young's modulus, a weight member 6 can be used which has a specific weight (1.8 or larger) larger than that of the driving member 2 and a Young's modulus of 1 GPa or less. Namely, a member is suitable for the weight member 6 in which a numerical value resulting by dividing its specific weight by its Young's modulus (specific weight/Young's modulus) is equal to or larger than $1.8 \times 10^{-9}$. Note that as an adhesive for bonding the weight member 6 and the piezoelectric element 1 together, an elastic adhesive is preferably used.

In addition, the weight member 6 is made up of a soft material, whereby a resonance frequency in the piezoelectric element 1 and the driving member 2 can be decreased sufficiently relative to a driving frequency in the piezoelectric element 1, so as to reduce the resonance effect. Assuming that for example, the driving frequency of the piezoelectric element 1 is f, and the resonance frequency of vibrations in the piezoelectric element 1 and the driving member 2 is $f_0$, it is preferable to satisfy a relationship of $f \geq 2^{1/2} \cdot f_0$. As this occurs, the vibration transmission rate of vibration resulting from the extension and contraction motions of the piezoelectric element 1 can be suppressed to a range equal to 1 or less, thereby making it possible to reduce the resonance effect. As a combination of frequencies, for example, the resonance frequency $f_0$ is made to be equal to or less than 70 kHz, and the driving frequency f is made to range from 50 to 100 kHz, whereby the aforesaid relationship of $f \geq 2^{1/2} \cdot f_0$ can be satisfied.

In addition, the weight member 6 is provided in such a state that the member is not fixed or supported relative to the stationary frame 4. Namely, the weight member 6 is not directly supported or fixed relative to the stationary frame 4. The end portion of the piezoelectric element 1 to which the weight member 6 is attached is made to constitute a free end.

Note that the weight member 6 may not be attached to the end portion of the piezoelectric element 1. Instead, a dummy layer on a free end side of the piezoelectric element 1 is formed heavier than a dummy layer on the other end side thereof so as to omit the provision of the weight member 6. As this occurs, by omitting the provision of the weight member 6, the length of the driving apparatus in the direction of extension and contraction of the piezoelectric element 1 can be reduced, thereby making it possible to reduce the size of the driving apparatus.

A movable lens 90 is mounted on the driven member 3 via a lens frame 91. The movable lens 90 is such as to make up a photographic optical system of a camera and constitutes an object to be moved by the driving apparatus. This movable lens 90 is provided integrally with the driven member 3 and is provided in such a way as to move together with the driven member 3. A stationary lens and the like, not shown, are provided on an optical axis O of the movable lens 90, so as to make up the photographic optical system of the camera. In addition, a photographic device 82 is provided on the optical axis O. The photographic device 82 is a photographic unit for converting an image formed by the photographic optical system into an electric signal and is made up of, for example, a CCD. The photographic device 82 is connected to the control unit 81 and output an image signal to the control unit 81.

A detector 83 is provided on the driving apparatus for detecting a moving position of the driven member 3. As the detector 83, for example, an optical detector is used, and a photoreflector, photointerrupter or the like is used. To be specific, in a case where a device including a reflector 83*a* and a detecting unit 83*b* is used as the detector 83, the reflector 83*a* is attached to the lens frame 91 which is formed integrally with the driven member 3, whereby a detection light is emitted from the detecting unit 83*b* to the reflector 83*a* side, and a reflection light which is reflected by the reflector 83*a* side is then detected by the detecting unit 83*b* so as to detect the moving position of the driven member 3 and the movable lens 90.

The detector 83 is connected to the control unit 81. An output signal of the detector 83 is inputted into the control unit 81. The control unit 81 is such as to control the whole of the driving apparatus, and is made up of, for example, a CPU, a ROM, a RAM, an input signal circuit, an output signal circuit and the like. In addition, the control unit 81 includes a driving circuit for activating the piezoelectric element 1 for operation, and a driving electric signal is outputted to the piezoelectric element 1 by this driving circuit.

In addition, in a case where the control of the movement of the movable lens 90 is sequence controlled and hence the detection of the position of the movable lens 90 is not implemented, there may occur a case where the place of the detector 83 is omitted.

FIG. 2 is a sectional view of a frictional engagement portion of the driven member 3 which is taken along the line II-II in FIG. 1.

As is shown in FIG. 2, the driven member 3 is brought into press contact with the driving member 2 by the leaf spring 7 in such a manner that the driven member 3 is frictionally engaged with the driving member 2. A V-shaped groove 3*a* is formed in the driven member 3. The cylindrical portion 21 of the driving member 2 is provided within this groove 3*a*. The leaf spring 7 is mounted in such a way as to hold the driving member 2 between the driven member 3 and itself. For example, a leaf spring material which is bent into an L-shape is used as the leaf spring 7, and one of plate-shaped pieces of the leaf spring 7 is attached to the driven member 3, while the other plate-shaped piece is hooked on the cylindrical portion 21 of the driving member 2, so as to press against the driven member 3 and the driving member 2.

By holding the driving member 2 by the leaf spring 7 and the driven member 3 in this way, the driven member 3 is made to be brought into linear contact with the driving member 2 at a plurality of locations, whereby the driven member 3 can be brought into frictional engagement with the driving member 2 in a stable fashion. In addition, since the driven member 3 is in engagement with the driving member 2 by virtue of the linear contact state realized at the plurality of locations, an engagement state substantially results which is similar to an engagement state in which the driven member 3 is in surface engagement with the driving member 2, thereby making it possible to realize a stable friction engagement therebetween.

Note that the leaf spring 7 and the abutment portion on the driven member 3 may be made into a shape having an arc-shaped cross section which extends along a circumferential surface of the driving member 2, so as to be brought into surface contact with the driving member 2. As this occurs, since the driven member 3 is brought into engagement with the driving member 2 in such a state that the driven member 3 is in surface contact with the driving member 2, the driven member 3 is allowed to be brought into frictional engagement with the driving member 2 in a stable fashion.

Note that while FIG. 2 illustrates the case where the cylindrical portion 21 of the driving member 2 is formed into the cylindrical element having a circular cross section, the cylindrical portion 21 may be formed into a cylindrical element having a rectangular cross section. In addition, while FIG. 2 illustrates the case where the piezoelectric element 1 which is disposed in the interior of the cylindrical portion 21 has the rectangular cross section, this piezoelectric element 1 may be formed into a shape having a circular cross section.

Figure 3:
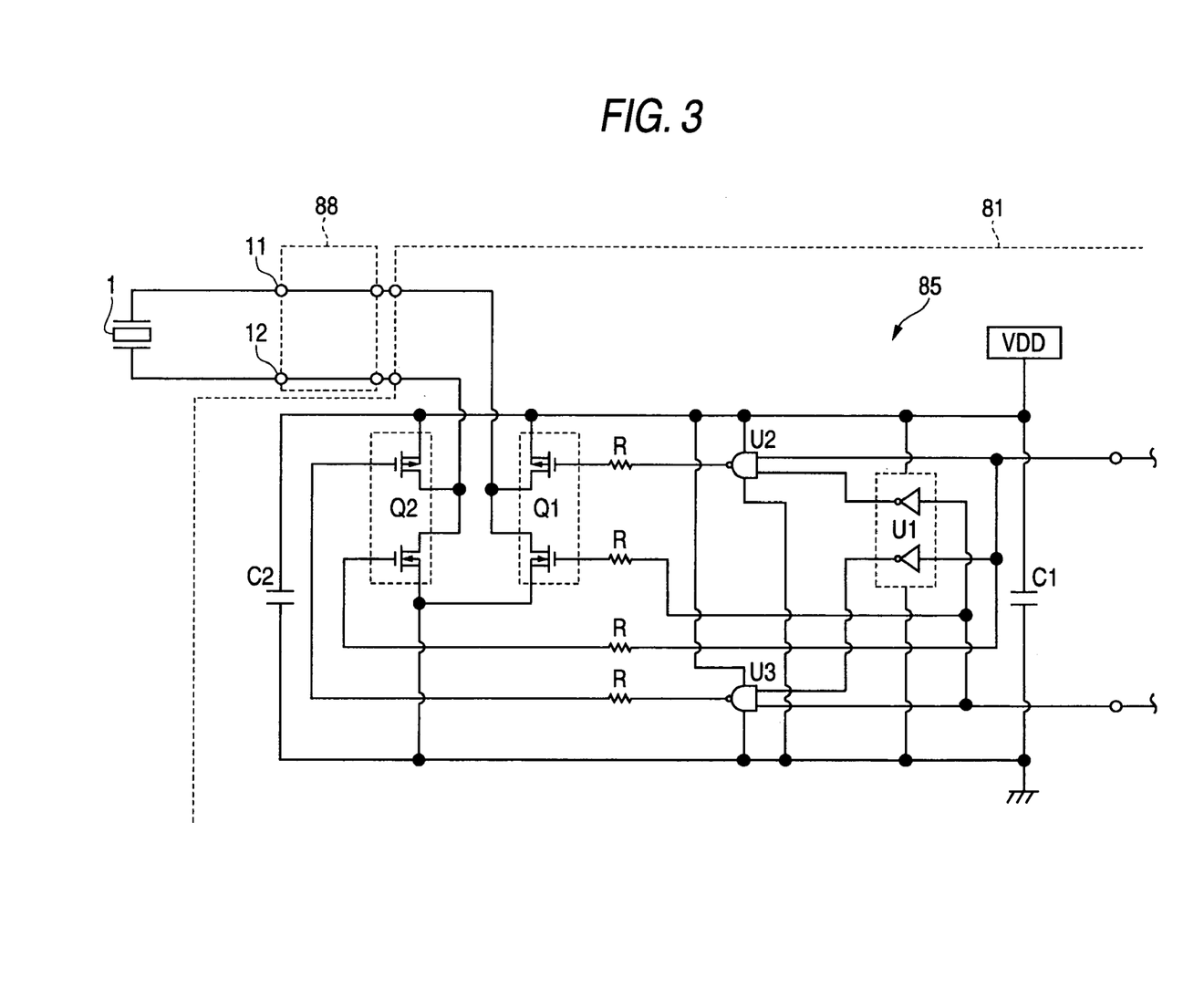
FIG. 3 is a diagram showing a driving circuit of the driving apparatus in FIG. 1.

FIG. 3 is a circuit diagram of a driving circuit for operating the piezoelectric element 1.

As is shown in FIG. 3, a driving circuit 85 is provided to be disposed within the control unit 81. The input terminals 11, 12 are provided on the piezoelectric element 1 and are illustrated at block 88 in FIG. 3. This driving circuit 85 is such as to function as a drive circuit for the piezoelectric element 1 and to output a driving electric signal to the piezoelectric element 1. The driving circuit 85 receives a control signal which is inputted thereinto from a control signal generating unit (not shown) of the control unit 81 and outputs a driving electric signal for the piezoelectric element 1 by amplifying the control signal with respect to voltage or current. For example, a circuit in which an input stage is made up of logic circuits U1 to U3 and field-effect transistors (FET) Q1, Q2 are provided for use as an output state is used for the driving circuit 85. The transistors Q1, Q2 are designed to be able to output, as output signals, an H output (a high potential output), an L output (a low potential output) and an OFF output (an open output). In FIG. 3, R is a resistor, and C1 and C2 are capacitors.

Figure 4A:
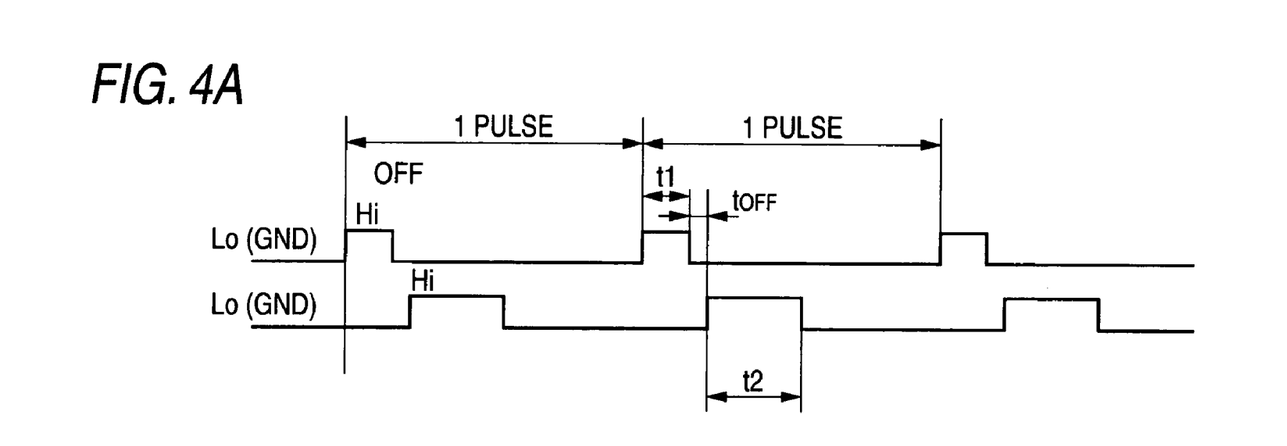
FIGS. 4A and 4B are diagrams showing waveforms of input signals which are inputted into the driving circuit shown in FIG. 3.
Figure 4B:
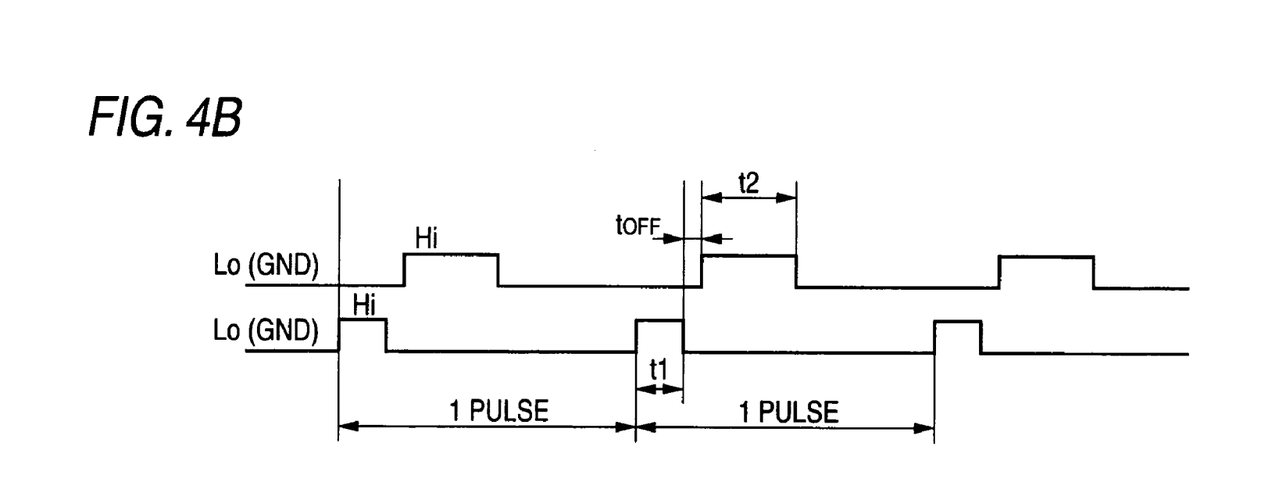
Figure 5A:
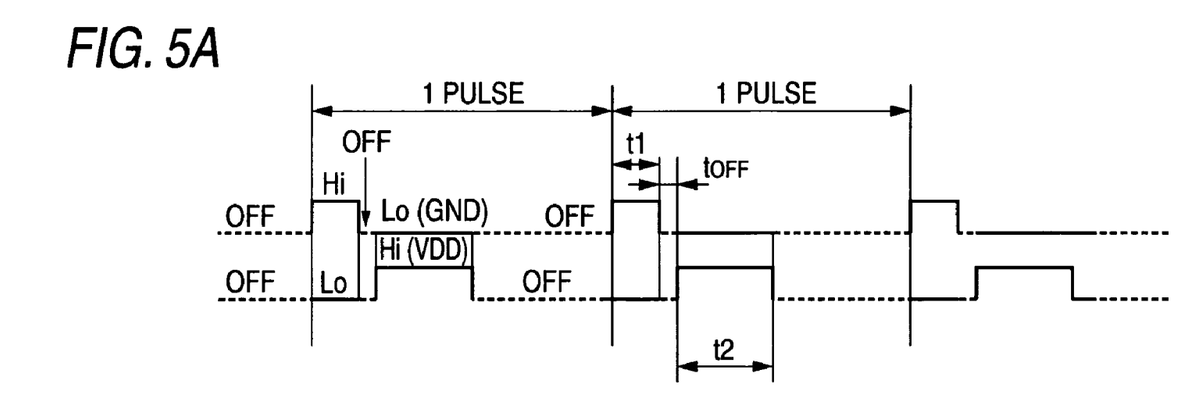
FIGS. 5A and 5B are diagrams showing waveforms of output signals which are outputted from the driving circuit shown in FIG. 3.
Figure 5B:
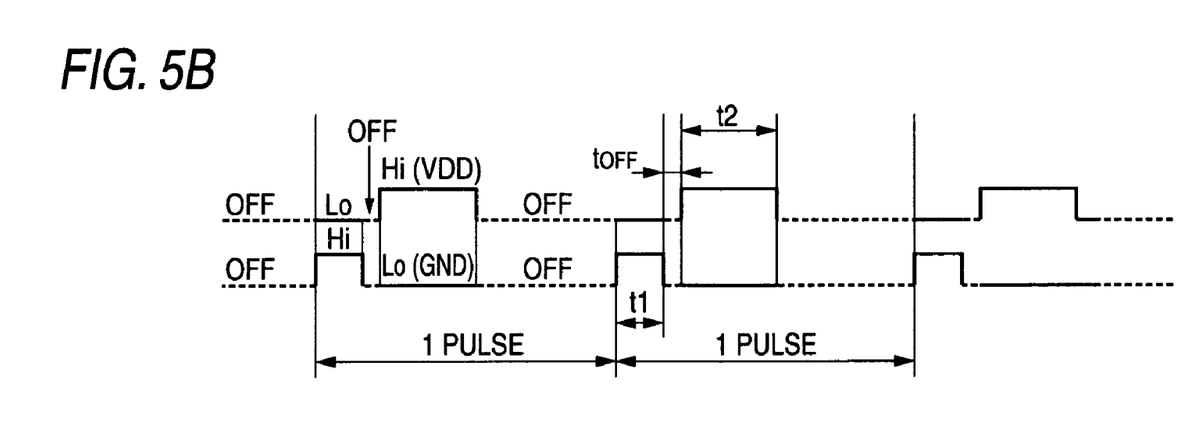

FIG. 4 shows input signals which are inputted into the driving circuit 85, and FIG. 5 shows output signals which are outputted from the driving circuit 85. FIG. 4A shows an input signal which is inputted when causing the driven member 3 to move in the direction in which the driven member 3 approaches a central position of the piezoelectric element 1 (rightwards as seen in FIG. 1), and FIG. 4B shows an input signal which is inputted when causing the driven member 3 to move in the direction in which the driven member 3 moves away from the central position of the piezoelectric element 1 (leftwards as seen in FIG. 1). In addition, FIG. 5A shows an output signal which is outputted when causing the driven member 3 to move in the direction in which the driven member 3 approaches the central position of the piezoelectric element 1 (rightwards as seen in FIG. 1), and FIG. 5B shows an output signal which is outputted when causing the driven member 3 to move in the direction in which the driven member 3 moves away from the central position of the piezoelectric element 1 (leftwards as seen in FIG. 1).

The output signals in FIGS. 5A and 5B are made to be pulse signals which are on and off at the same timing as the input signals shown in FIGS. 4A and 4B. The two signals in FIGS. 5A and 5B are inputted into the input terminals 11, 12 of the piezoelectric element 1. Although signals made up of trapezoidal waveforms may be inputted into the input terminals 11, 12, the rectangular pulse signals shown in FIG. 5 can be inputted so as to activate the piezoelectric element 1. As this occurs, since the driving signal of the piezoelectric element 1 may take the form of the rectangular pulse signal, the signal generation is facilitated.

The output signals shown in FIGS. 5A and 5B are each made up of two rectangular pulse signals having the same frequency. These two pulse signals are made to be signals in which a potential difference between respective signals increases in a stepped fashion and decreases drastically or the potential difference increases drastically and decreases in a stepped fashion by causing their phases to differ from each other. By inputting the two signals, the extension speed and contraction speed of the piezoelectric element 1 can be caused to differ from each other, whereby the driven member 3 can be caused to move.

For example, of the two signals shown in FIGS. 5A and 5B, it is set such that the other signal becomes H (high) after one signal becomes H (high) and is then decreased to L (low). In those signals, it is set such that when one signal becomes L, the other signal becomes H after a certain determined time lag $t_{OFF}$ has elapsed. In addition, in the event that the two signals are both L, the output state becomes an off state (an open state).

As the output signals or electric signals shown in FIGS. 5A and 5B which activate the piezoelectric element 1, a signal is used whose frequency exceeds the audible frequency. In FIGS. 5A and 5B, the frequencies of the two signals are made to be a signal frequency which exceeds the audible frequency, and a signal frequency of, for example, 30 to 80 kHz is preferably used, and a signal frequency of 40 to 60 kHz is more preferably used. By using signals having these frequencies, the operation noise of the piezoelectric element 1 within the audible frequency area can be reduced.

Next, the operation of the driving apparatus according to the embodiment will be described.

In FIG. 1, electric signals are inputted into the piezoelectric element 1, and the piezoelectric element 1 repeats its extension and contraction when the electric signals are so inputted. The driving member 2 reciprocates in response to the extension and contraction of the piezoelectric element 1. As this occurs, by causing the extension speed and contraction speed of the piezoelectric element 1 to differ from each other, a speed at which the driving member 2 moves to a certain determined direction and a speed at which the driving member 2 moves to an opposite direction are caused to differ from each other, whereby the driven member 3 and the movable lens 90 can be caused to move in desired directions.

For example, in a case where the piezoelectric element 1 repeats a quick extending motion and a slow contracting motion, the driven member 3 moves relative to the driving member 2 in the direction in which the driven member 3 approaches the central position of the piezoelectric element 1. On the contrary, in a case where the piezoelectric element 1 repeats a slow extending motion and a quick contracting motion, the driven member 3 moves relative to the driving member 2 in the direction in which the driven member 3 moves away from the central position of the piezoelectric element 1.

Thus, as has been described heretofore, according to the driving apparatus of the embodiment, the driving member 2 has the cylindrical portion 21 which extends in the direction of extension and contraction of the piezoelectric element 1 in the position which lies on the side of the piezoelectric element 1, and the driven member 3 is frictionally engaged with the cylindrical portion 21. Because of this, it becomes possible to avoid the problem that the driving member 2 extends long in the direction of extension and contraction of the piezoelectric element 1 from the end face of the piezoelectric element 1, a reduction in the length of the driving apparatus in the direction of extension and contraction of the piezoelectric element 1 being thereby realized. Consequently, the reduction in the size of the driving apparatus can be realized.

Figure 6:
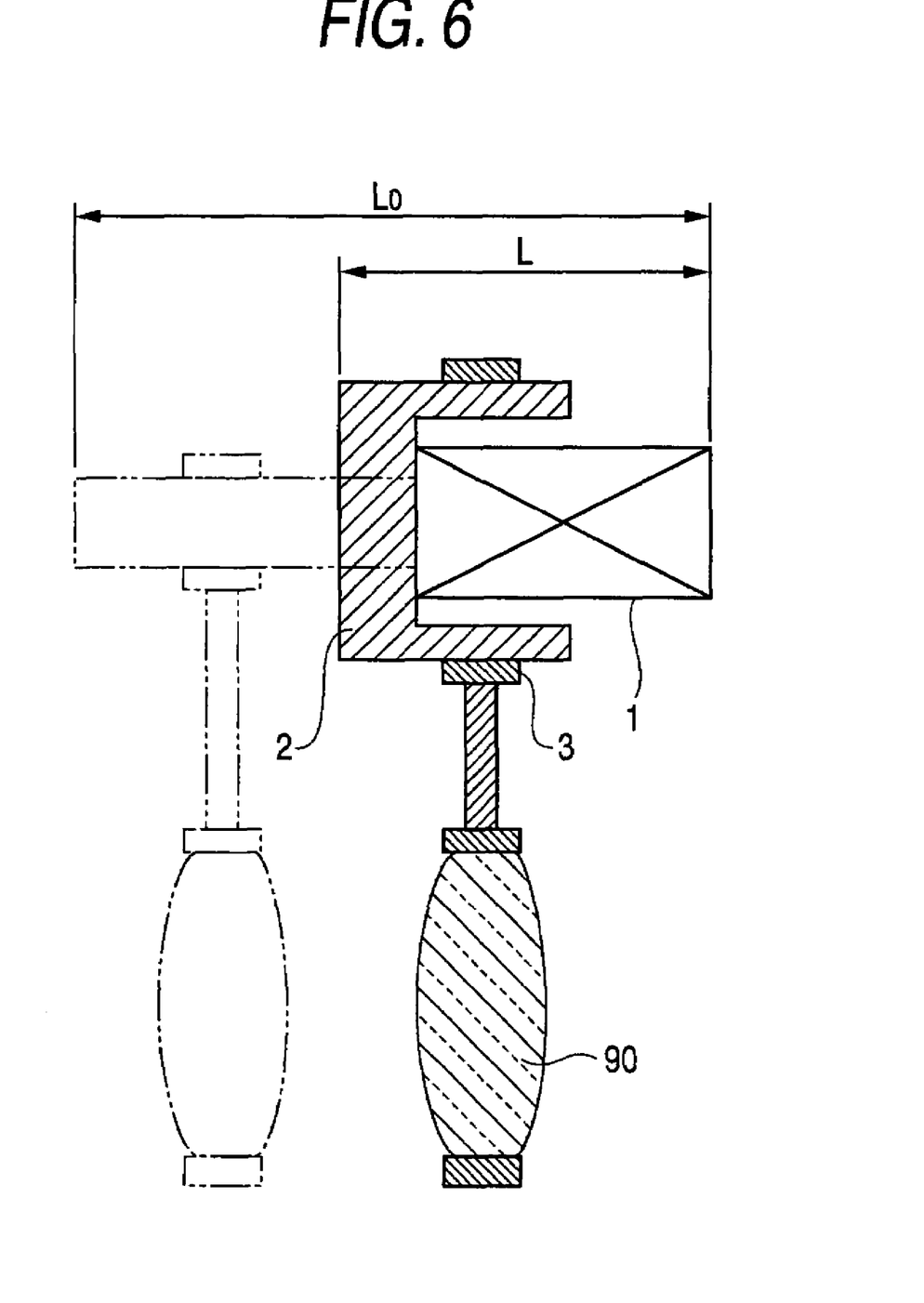
FIG. 6 is an explanatory diagram which compares in size the driving apparatus shown in FIG. 1 with the related-art driving apparatus.

For example, as is shown in FIG. 6, in the driving apparatus according to the embodiment of the invention, a length L which results from the connection of the piezoelectric element 1 and the driving member 2 in the direction of extension and connection of the piezoelectric element 1 becomes shorter than a length L0 which results from the connection of the piezoelectric element 1 and the driving member 2 of the related-art driving apparatus in the direction of extension and connection of the piezoelectric element 1. Because of this, the driving apparatus can be made to be thin in the direction of extension and contraction of the piezoelectric element 1, thereby making it possible to reduce the size of the driving apparatus.

Figure 7:
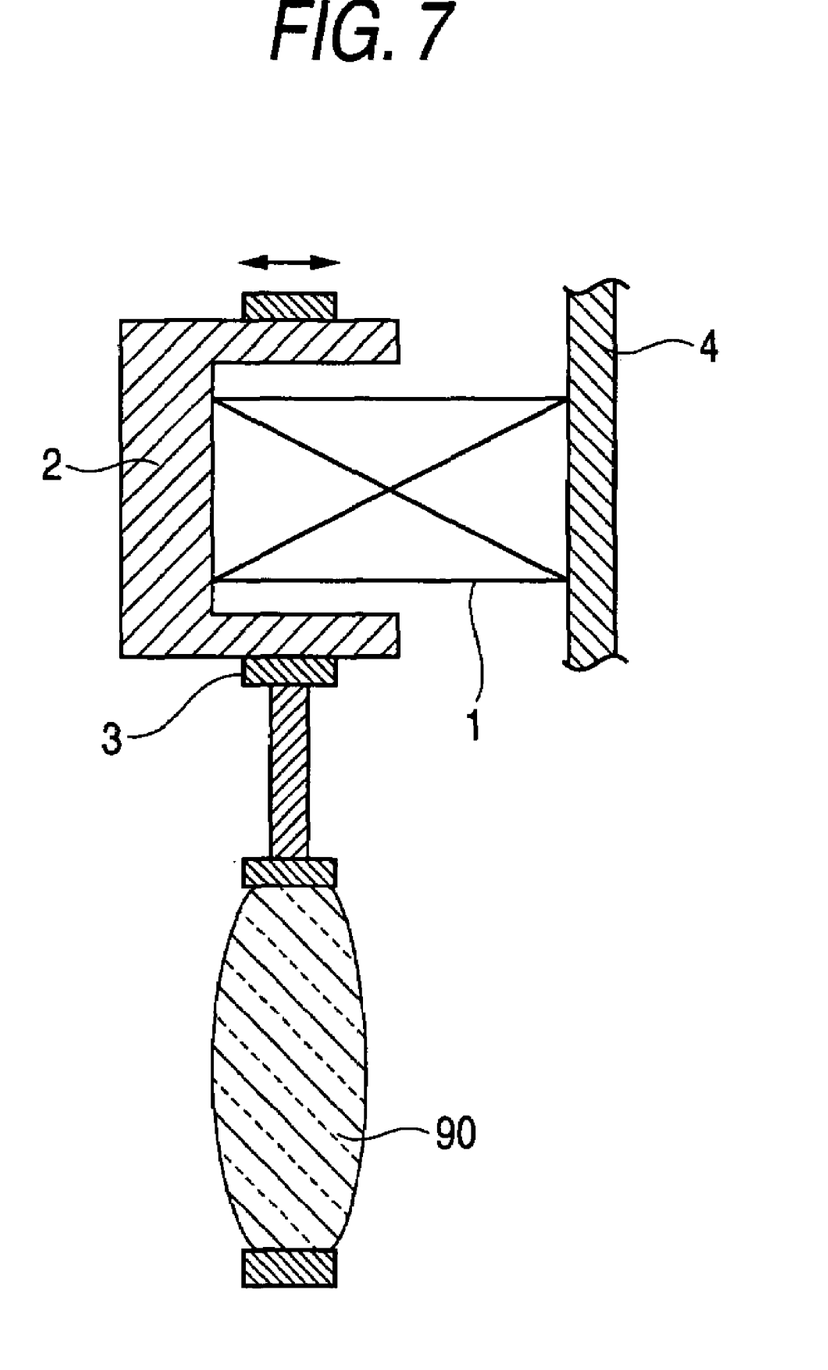
FIG. 7 is an explanatory diagram of a modified example made to the driving apparatus according to the embodiment of the invention.

Note that while in this embodiment, the case is described in which the piezoelectric element 1 is mounted while being supported from the sides relative to the direction of extension and contraction thereof, so as to allow the end portion of the piezoelectric element 1 to constitute the free end, the driving apparatus of the invention is not limited to the configuration, and as is schematically shown in FIG. 7, a configuration may be adopted in which the end portion of a piezoelectric element 1 is fixed to a stationary frame 4. In this case, since the weight member 6 does not have to be attached to the end portion of the piezoelectric element 1, the driving apparatus can be made smaller in size.

Figure 8:
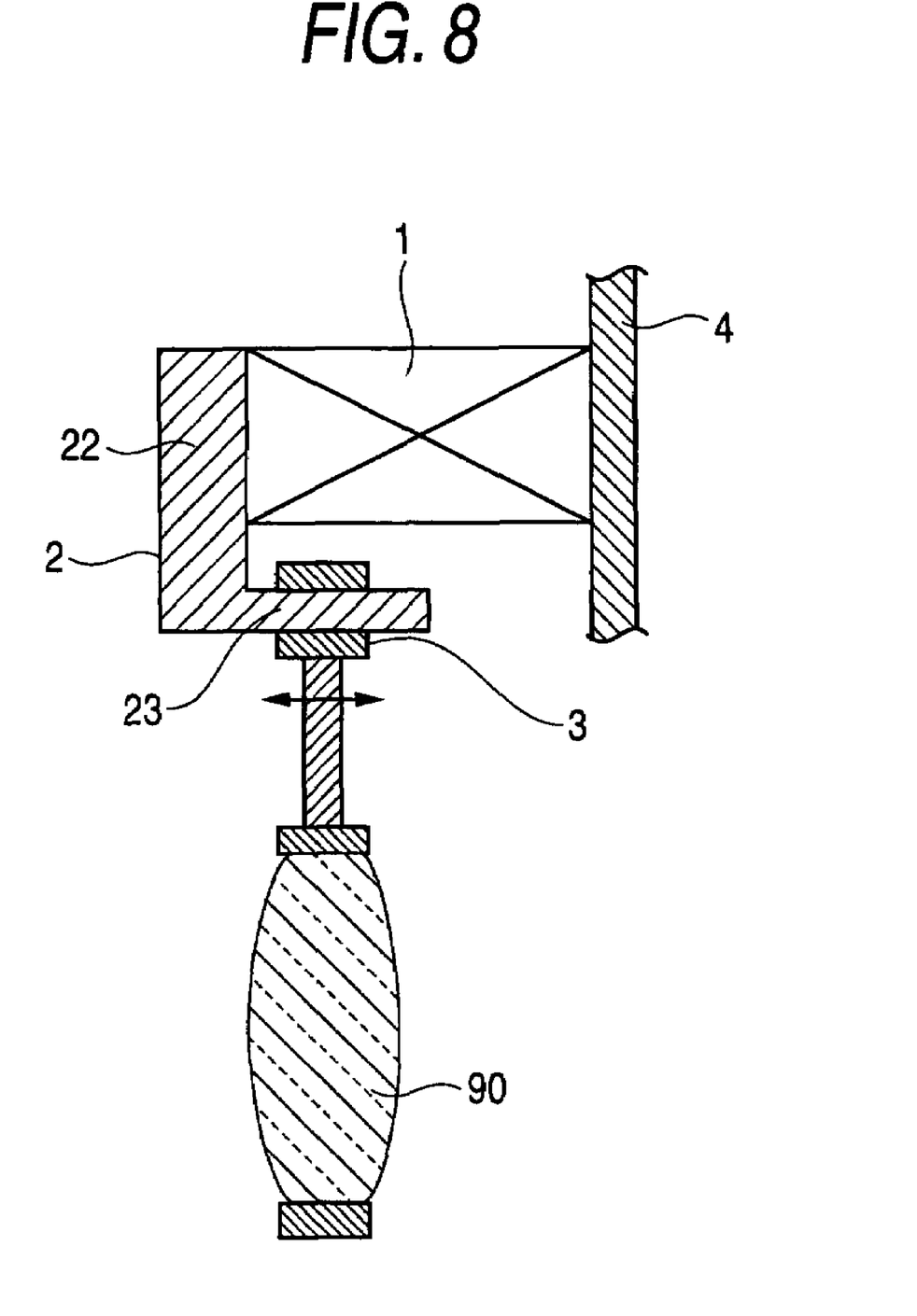
FIG. 8 is an explanatory diagram of another modified example made to the driving apparatus according to the embodiment of the invention.

In addition, as is shown in FIG. 8, the driving member 2 is not formed into the cylindrical shape, and instead, a driving member 2 may be provided which extends from an end portion 22 thereof which is attached to a piezoelectric element 1 in a direction in which it moves away from a side of the piezoelectric element 1 to have a shaft portion 23 which is provided to extend in a direction of extension and contraction of the piezoelectric element 1 in a position which lies facing the side of the piezoelectric element 1. In this case, the shaft portion 23 is formed into not a cylindrical shape but a rod shape. A driven member 3 is brought into frictional engagement with the shaft portion 23 in such a manner as to move therealong. As the shaft portion 23, for example, a circular pillar-like element having a circular cross section is used. In addition, an element having a cross section which results by cutting away part of a circular shape may be used as the shaft portion 23. For example, an element may be used which has an oval cross section which results by cutting away both side portions of the circular shape. Even though the driving apparatus is configured like this, the length of the driving apparatus in the direction of extension and contraction of the piezoelectric unit can be reduced, thereby making it possible to realize the reduction in the size of the driving apparatus. In addition, with the driving apparatus configured like this, since the driving member 2 can be configured small and the frictional engagement portion of the driven member 3 can also be made small, compared to the driving apparatus shown in FIG. 1, the whole of the driving apparatus can be made smaller.

Note that the driving apparatus according to the embodiment and modified examples made thereto are such as to illustrate the examples of the driving apparatus according to the invention. The driving apparatus of the invention is not limited to the driving apparatus according to the embodiment and the modified examples made thereto, and hence, the driving apparatus according to the embodiment and the modified examples made thereto may be modified further or the invention may be applied to other applications without departing from the spirit and scope of the invention which are described in the claims of the invention.

According to the invention, the driving apparatus can be made shorter in the direction of extension and contraction of the piezoelectric element, thereby making it possible to realize the reduction in the size of the driving apparatus.

The entire disclosure of each and every foreign patent application from which the benefit of foreign priority has been claimed in the present application is incorporated herein by reference, as if fully set forth.

What is claimed is:

1. A driving apparatus comprising:
an electro-mechanical conversion element;
a driving member that reciprocates in response to an extension and contraction of the electro-mechanical conversion element; and
a driven member, frictionally engaged with the driving member, that moves by reciprocating the driving member,
wherein the driving member comprises a shaft portion which extends along a lateral side of said electro-mechanical conversion element in a direction of extension and contraction of the electro-mechanical conversion element, so that a perpendicular line through said lateral side intersects said shaft,
the driven member is frictionally engaged with the shaft portion, and
a weight member is attached to an end portion of said electro-mechanical conversion element.

2. A driving apparatus as set forth in claim 1,
wherein the shaft portion is disposed in such a manner as to cover the periphery of the electro-mechanical conversion element.

3. A driving apparatus as set forth in claim 1,
wherein the shaft portion has a circular pillar-like shape or a circular cylindrical shape.

4. A driving apparatus as set forth in claim 1,
wherein the driving member comprises a composite resin material.

5. A driving apparatus as set forth in claim 1, wherein the end portion of said electro-mechanical conversion element to which said weight member is attached is a free end.

6. A driving apparatus as set forth in claim 1, wherein said electro-mechanical conversion element is a piezoelectric element, and when the driving frequency of said piezoelectric element is f and the resonance frequency of vibrations in said piezoelectric element and in said driving member is $f_0$, the following relationship is satisfied: $f \geq 2^{1/2} \cdot f_0$.

7. A driving apparatus comprising:
an electro-mechanical conversion element;
a driving member that reciprocates in response to an extension and contraction of the electro-mechanical conversion element; and
a driven member, frictionally engaged with the driving member, that moves by reciprocating the driving member,
wherein the driving member comprises a shaft portion which extends in a direction of extension and contraction of the electro-mechanical conversion element in a position which lies on a side of the electro-mechanical conversion element, the driven member is frictionally engaged with the shaft portion, and a weight member is attached to an end portion of said electro-mechanical conversion element, wherein a Young's modulus of the weight member is equal or less than 1 GPa.

* * * * *